United States Patent [19]
Lee, II

[11] 3,874,409
[45] Apr. 1, 1975

[54] SELECTOR VALVE
[75] Inventor: Leighton Lee, II, Guilford, Conn.
[73] Assignee: The Lee Company, Westbrook, Conn.
[22] Filed: Mar. 29, 1973
[21] Appl. No.: 345,984

[52] U.S. Cl. ............ 137/599.2, 137/269.5, 251/209
[51] Int. Cl. .......................... F16k 3/22, F16k 15/18
[58] Field of Search ..... 137/269, 269.5, 599, 599.2, 137/614.2, 625.3, 614.17; 251/205, 208, 209

[56] References Cited
UNITED STATES PATENTS

| | | | |
|---|---|---|---|
| 943,346 | 12/1909 | Forsman | 137/599.2 |
| 1,191,084 | 7/1916 | Kirby | 137/269.5 |
| 1,238,664 | 8/1917 | Groom | 137/269.5 |
| 2,399,300 | 4/1946 | Stewart et al. | 137/625.31 X |
| 2,911,008 | 11/1959 | Du Bois | 251/208 X |
| 3,653,406 | 4/1972 | Racki | 137/625.3 X |
| 3,698,683 | 10/1972 | De Angelis | 251/209 |

*Primary Examiner*—Henry T. Klinksiek
*Attorney, Agent, or Firm*—Prutzman, Hayes, Kalb & Chilton

[57] ABSTRACT

A pneumatic system with an air pressure gauge and a selector valve for selectively connecting the air pressure gauge for providing air pressure readings of the minimum, maximum and average pressure levels of a fluctuating air pressure source.

8 Claims, 2 Drawing Figures

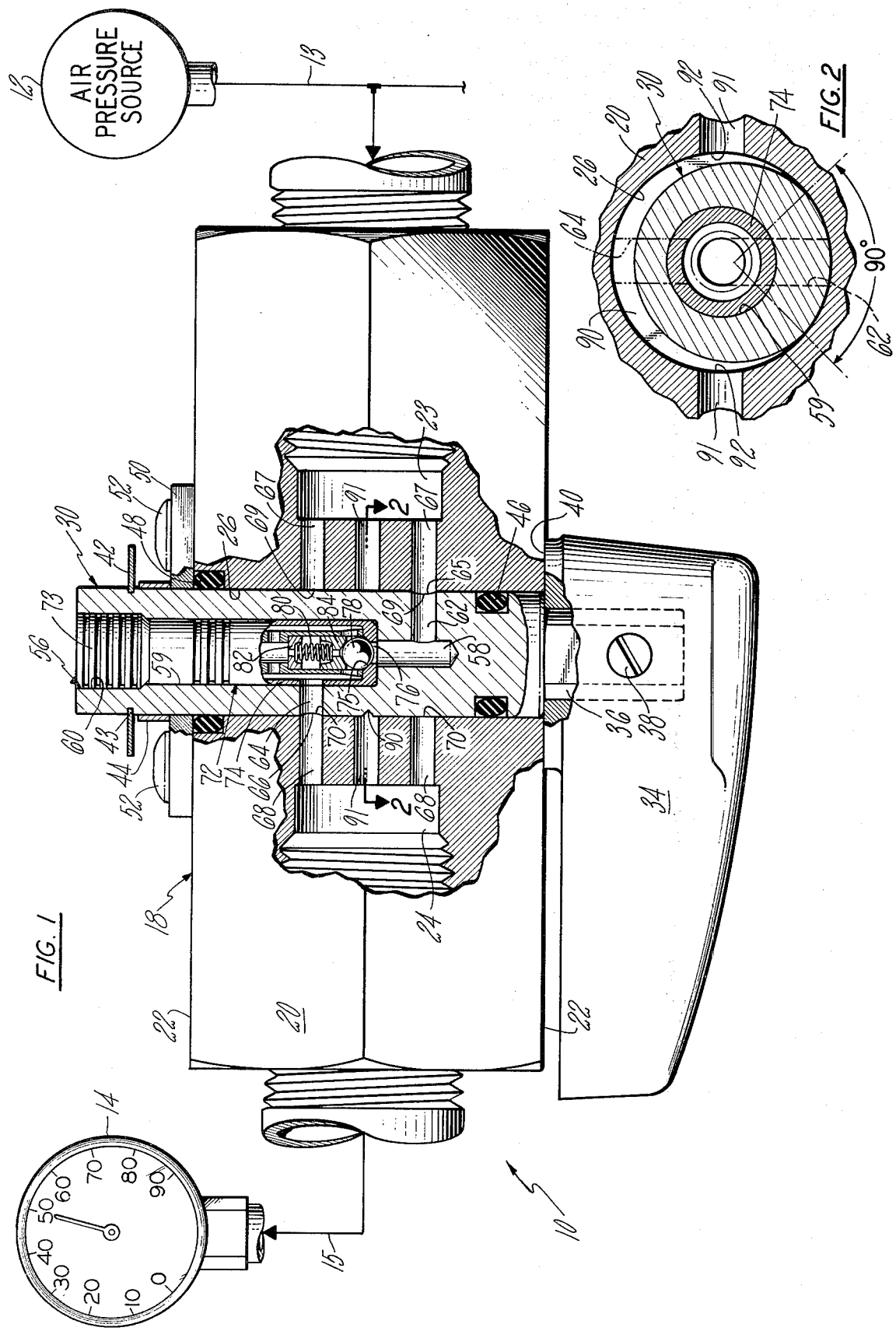

3,874,409

SELECTOR VALVE

BRIEF SUMMARY OF THE INVENTION

The present invention relates generally to selector valves and more particularly to a new and improved selector valve having notable utility with a fluid pressure gauge for selectively connecting the pressure gauge to provide pressure readings of different pressure levels of a fluctuating fluid pressure.

It is a primary aim of the present invention to provide a new and improved selector valve for a fluid pressure gauge for selectively providing pressure readings of the maximum and minimum pressure levels of a pulsating or other cyclical or fluctuating fluid pressure.

It is another aim of the present invention to provide a new and improved pressure gauge selector valve for selectively providing pressure gauge readings of the maximum and/or minimum pressure levels and an average pressure level of a fluctuating fluid pressure.

It is a further aim of the present invention to provide a new and improved selector valve for a fluid pressure system for establishing a selected pressure level in a fluid pressure line substantially equal to the minimum and/or maximum and/or average pressure level of a fluctuating fluid pressure source.

It is another aim of the present invention to provide a new and improved selector valve for selectively establishing unidirectional fluid flow in a fluid conduit in each of two alternative flow directions.

It is a further aim of the present invention to provide a new and improved selector valve of the type described having a compact and economical design providing reliable service over a long useful maintenance free life.

Other objects will be in part obvious and in part pointed out more in detail hereinafter.

A better understanding of the invention will be obtained from the following detailed description and the accompanying drawing of an illustrative application of the invention.

BRIEF DESCRIPTION OF THE DRAWING

In the drawing:

FIG. 1 is a partly schematic view, partly broken away and partly in section, of a pneumatic system employing an embodiment of a selector valve of the present invention and showing a valve member thereof in one operative position; and FIG. 2 is an enlarged partial longitudinal section view, partly broken away and partly in section, of the selector valve taken substantially along line 2—2 of FIG. 1 and showing the valve member in another operative position and showing in phantom the relative position of an outlet conduit of the selector valve.

DESCRIPTION OF THE PREFERRED EMBODIMENT

Referring now to the drawing in detail, there is shown a pneumatic system 10 having an air pressure source 12 (for example an air tank connected to a suitable air pump which is controlled to establish a predetermined air pressure level within the air tank), a suitable air delivery system 13 for connecting the air source to associated apparatus (not shown) which employ the air pressure, a pneumatic pressure gauge 14 with an air conduit 15, and an embodiment 18 of a selector valve incorporating the present invention connected between the air system 13 and conduit 15 to control the air flow between the air system 13 and gauge 14.

The selector valve 18 is shown comprising an elongated valve body 20 having a constant hexagonal cross-section with three pairs of diametrically opposed parallel sides 22 and longitudinally extending coaxial bores 23, 24 at the longitudinal ends of the valve body 20 having standard pipe threads for connecting the valve to the fluid system 13 and conduit 15. A transverse cylindrical bore 26 extending normal to one pair of the parallel sides 22 of the valve body 20 is provided centrally in the valve body 20, and a cylindrical valve member 30 is rotatably mounted in the cylindrical bore 26. A selector knob 34 is mounted on a reduced axially extending valve stem 36 and is secured thereto by a set screw 38 for selectively angularly positioning the valve member 30. A flat inner face 40 of the selector knob 34 is engageable with a side 22 of the valve body 20 to limit axial movement of the valve member 30 in one axial direction, and a suitable locking ring 42 mounted within an annulus 43 at the opposite end of the valve member 30 cooperates with a spacer sleeve 44 to limit axial movement of the valve member 30 in the opposite axial direction. Suitable annular air seals 46, 48 are provided at opposite ends of the cylindrical bore 26, and the cylindrical bore 26 and valve member 30 are formed to prevent any substantial fluid flow along their mating surfaces. In the shown embodiment, the annular seal 46 is mounted within an annulus in the valve member 30 and the annular seal 48 is mounted within an enlarged bore portion at the opposite end of the bore 26 and is retained therein by a retainer plate 50 having an opening for receiving the valve member 30 and secured to a side 22 of the valve body by suitable fasteners 52.

The cylindrical valve member 30 has an axially extending bore 56 with an inner relatively small diameter cylindrical bore portion 58, an intermediate larger diameter cylindrical bore portion 59 and an outer slightly larger diameter cylindrical bore portion 60. A pair of axially spaced radially extending inlet and outlet bores or conduits 62, 64 respectively are provided in the valve member 30 to provide an inlet port 65 in communication with the inner bore portion 58 and an outlet port 66 in communication with the intermediate bore portion 59. A pair of inlet and outlet longitudinally extending bores or conduits 67, 68 respectively are provided in each end of the valve body 22 to provide axially spaced inlet and outlet ports 69, 70 respectively in each end of the valve body which cooperate with the inlet and outlet ports 65, 66 respectively of the valve member. The valve member ports 65, 66 are diametrically opposed (as well as being axially offset) and the axes of the pairs of inlet and outlet ports 69, 70 in the valve body lie in a common longitudinally extending plane passing through the axis of the rotary valve member 30.

A suitable one-way ball check valve assembly 72 is mounted within the intermediate bore portion 59 of the valve member 30 and is secured in position by a suitable plug 73 press fit within the bore portion 60. The ball check valve assembly 72 is shown comprising an outer housing 74 with an axial inlet opening 76 in alignment with the reduced bore portion 58 and a suitable valve seat 75 for receiving a ball check valve 78 for permitting unidirectional fluid flow from the valve member inlet port 65 to the outlet port 66. The ball is biased against the seat by a suitable light compression spring 80 mounted between a fixed spring retainer 82 and a slideable spring retainer 84 which engages the ball 78. Thus, when the force on the ball from the fluid pressure at the inlet port 65 exceeds the opposing force on the ball from the fluid pressure at the outlet port 66 by the amount of the light spring bias, the ball valve 78 is lifted off its valve seat 75 to permit unidirectional fluid flow from the inlet port 65 to the outlet port 66. As can be readily understood, fluid flow is prevented in the reverse direction by the ball check valve 78.

Accordingly, the valve member can be angularly positioned in each of two 180° spaced reverse operating positions with its ports 65, 66 in fluid communication with two ports 69, 70 of the valve body. In one of the two reverse angular operating positions of the valve member 30 (e.g. that shown in FIG. 1) its inlet port 65 is in fluid communication with the inlet port 69 at one end of the valve body and its outlet port 66 is in fluid communication with the outlet port 70 at the opposite end of the valve body and such that unidirectional fluid flow is provided in one direction through the selector valve (from right to left through the selector valve as viewed in FIG. 1 with the valve member 30 in its operating position shown in FIG. 1). By rotating the valve member 180° to a reverse operating position, the valve member inlet and outlet ports 65, 66 are connected to opposite ends of the valve body to provide for unidirectional fluid flow in an opposite direction through the selector valve.

Therefore, with the valve member 30 in its operating position shown in FIG. 1 air is free to flow only from the air system 13 to the pressure gauge 14 and such that the pressure gauge 14 provides a pressure reading of the maximum pressure in the air system 13. By angularly shifting the valve member to a 180° reverse operating position, the direction of air flow through the selector valve is reversed and the pressure gauge 14 will provide a pressure reading of the minimum pressure level in the line 13.

Consequently, where a fluctuating or pulsating air pressure is present in the air system 13—due for example to the cyclical air demands of the associated apparatus (not shown) connected to the air system 13 or due to a pulsating supply of air to the system by the air system pump (not shown)—the selector valve is operable to provide pressure readings of the maximum and minimum pressure levels of the fluctuating air pressure.

The selector valve 18 is also operable for selecting an intermediate or average pressure reading. For this purpose, a circumferentially extending peripheral groove 90 is provided on the valve member 30 and longitudinally extending bores or conduits 91 having diametrically opposed coaxial ports 92 are provided in the ends of the valve body 20 for cooperation with the peripheral groove 90. In the shown embodiment, the peripheral groove 90 extends approximately 270° around the valve member 30, and, as shown in FIG. 2, the circumferential groove 90 is located relative to the inlet port 65 of the valve member 30 such that when the valve member inlet port 65 is in fluid communication with either of the valve body inlet ports 69 the groove 90 is out of fluid communication with the intermediate ports 92. With the valve member 30 in a 90° intermediate position shown in FIG. 2 the intermediate ports 92 in the valve body 20 are interconnected by the peripheral groove 90 to permit air flow in both directions between the air system 13 and pressure gauge 14. The cross-sectional area of the groove 90 is made sufficiently small to provide a restricted air passageway or orifice and such that the pressure gauge will provide a pressure reading which is approximately the average pressure level in the fluctuating air pressure system. Also, the groove 90 is formed as an eccentric annulus with its cross-sectional area diminishing in both angular directions from the center of the groove and such that the valve member 30 may be rotated up to 45° in either direction from its 90° intermediate position shown in FIG. 2 to vary the fluid restriction between the intermediate ports 92 established by the peripheral groove 90. Consequently, where there is a fluctuating pressure reading with the valve member 30 in its 90° intermediate position the valve member can be rotated up to 45° in either angular direction from its 90° position to stabilize the pressure gauge reading at an average air pressure.

Thus, it can be seen that the selector valve 30 can be manually operated to selectively provide pressure gauge readings of the minimum, maximum and average pressure levels of a fluctuating pressure source. Also, the selector valve is useful for selecting unidirectional fluid flow in each of two alternative flow directions. Further, the selector valve may be employed for establishing a selected pressure level in a fluid pressure line substantially equal to the minimum, maximum, or average pressure level of a fluid pressure source.

As will be apparent to persons skilled in the art, various modifications, adaptations and variations of the foregoing specific disclosure can be made without departing from the teachings of the present invention.

I claim:

1. A selector valve comprising a valve body having a valve operating chamber and first and second separate fluid conduit means connected to the valve operating chamber, a valve member shiftable in the operating chamber to first and second separate operating positions thereof, the valve member having passageway means with inlet and outlet means, valve member operating means for selectively shifting said valve member to its said first and second operating positions, and one-way valve means in the passageway means of the valve member for providing unidirectional fluid flow from the inlet means to the outlet means of the valve member, the valve member having in one of its said positions its inlet and outlet means in fluid communication with said first and second conduit means respectively and in its other position its inlet and outlet means in fluid communication with said second and first conduit means respectively whereby unidirectional fluid flow is established through the valve having a direction depending on the operating position of the valve member, the valve member being shiftable to a third separate operating position, and having restricted fluid conduit means providing a restricted fluid connection between the first and second conduit means in said third separate operating position of the valve member, the restricted fluid conduit means comprising a peripheral groove in the valve member having a variable cross-section.

2. A selector valve according to claim 1 wherein the valve member is angularly shiftable in the valve operating chamber to its said first, second and third separate operating positions.

3. A selector valve according to claim 2 wherein the inlet and outlet means of the valve member are axially spaced and wherein each of said first and second conduit means have axially spaced conduit portions connected to the inlet and outlet means of the valve member in the first and second operating positions of the valve member respectively.

4. A selector valve according to claim 2 wherein the passageway means in the valve member comprises a first axially extending bore and second and third axially spaced bores extending generally radially from said first bore and providing said inlet and outlet means, and wherein the oneway valve means is mounted in the first axially extending bore between the second and third axially spaced bores.

5. A fluid pressure registering system according to claim 1 wherein the valve member is angularly shiftable in the valve chamber and is angularly shiftable to its said first and second operating positions and to a third separate variable operating position variable through a predetermined operating angle of the valve member, and wherein the valve member has restricted fluid conduit means providing a restricted fluid connection between the first and second conduit means in said third variable operating position having a fluid restriction variable through said predetermined operating angle of the valve member.

6. A selector valve comprising a valve body having a valve operating chamber and first and second separate fluid conduit means connected to the valve operating chamber, a valve member angularly shiftable in the operating chamber to first and second separate angular operating positions thereof and to a third separate variable operating position thereof variable through a predetermined operating angle, the valve member having third conduit means with inlet and outlet means and a separate fourth variable restriction circumferentially extending peripheral groove for establishing a restriction between the first and second conduit means in the valve body variable through said predetermined operating angle of the valve member, valve member operating means for selectively angularly setting said valve member at its said first and second operating positions and within its said predetermined operating angle, the first, second and third fluid conduit means providing passageway means with first and second different fluid connections through the selector valve in said first and second operating positions of the valve member respectively, and one-way valve means in the passageway means providing unidirectional fluid flow in opposite directions through said valve in said first and second operating positions of the selector valve, whereby selected restricted fluid flow or selected unidirectional flow through the selector valve is established with the angular setting of the valve member.

7. A selector valve comprising a valve body having a valve operating chamber and first and second separate fluid conduit means connected to the valve operating chamber, a valve member angularly shiftable in the operating chamber to a first operating position thereof and to a second separate variable operating position thereof variable through a predetermined operating angle of the valve member, the valve member having third conduit means with inlet and outlet means and fourth separate variable restriction conduit means comprising a peripheral groove in the valve member having a variable cross-section, valve member operating means for selectively angularly setting the valve member at its said first operating position and within its said predetermined operating angle, and one-way valve means in the third conduit means of the valve member providing unidirectional fluid flow from its inlet means to its outlet means, the valve member having in its said first position its inlet and outlet means in fluid connection with said first and second conduit means respectively to establish unidirectional flow from the first conduit means to the second conduit means and having in its said second variable operating position its peripheral groove in fluid connection with the first and second conduit means to establish a restricted fluid connection between the first and second conduit means variable by the setting of the valve member within said predetermined operating angle.

8. In a fluid pressure registering system for registering the fluid pressure of a fluctuating fluid pressure source, having fluid pressure registering means, a fluid container containing the fluctuating fluid pressure, a fluid conduit connecting the fluid pressure registering means to the fluid container for registering therewith a pressure level of the fluid pressure within the fluid container and a register control valve in the fluid inlet conduit selectively operable for selectively connecting the fluid pressure registering means to the fluid container, the improvement wherein the register control valve comprises a valve body having a valve operating chamber and first and second separate fluid conduit means connected to the valve operating chamber, one of the fluid conduit means being connected to the fluid pressure registering means and the other fluid conduit means being connected to the fluid container, a valve member shiftable in the operating chamber to first and second separate operating positions thereof, the valve member having passageway means with inlet and outlet means, valve member operating means for selectively setting said valve member at its said first and second operating positions, one-way valve means in the passageway means of the valve member for providing unidirectional fluid flow from the inlet means to the outlet means of the valve member, the valve member having in one of its said positions its inlet and outlet means in fluid communication with said first and second conduit means respectively and in its other position its inlet and outlet means in fluid communication with said second and first conduit means respectively whereby unidirectional fluid flow is established through the register control valve between the fluid container and fluid pressure registering means having a direction depending on the operating position of the valve member and whereby the valve member is adapted to be selectively set to register with the fluid pressure registering means the maximum and minimum pressure levels of the fluid pressure within the fluid container.

* * * * *

UNITED STATES PATENT OFFICE
CERTIFICATE OF CORRECTION

PATENT NO. : 3,874,409
DATED : April 1, 1975
INVENTOR(S) : LEIGHTON LEE II

It is certified that error appears in the above-identified patent and that said Letters Patent are hereby corrected as shown below:

Column 5, line 17, delete "1" and substitute therefor --8--.

Signed and Sealed this ninth Day of September 1975

[SEAL]

Attest:

RUTH C. MASON
*Attesting Officer*

C. MARSHALL DANN
*Commissioner of Patents and Trademarks*